US012603008B2

(12) United States Patent
Wassef et al.

(10) Patent No.: US 12,603,008 B2
(45) Date of Patent: Apr. 14, 2026

(54) SEMI-TRUCK DETECTION AND AVOIDANCE

(71) Applicant: GM GLOBAL TECHNOLOGY OPERATIONS LLC, Detroit, MI (US)

(72) Inventors: Andrew Wassef, Novi, MI (US); Emily Frances Wolfangel, West Bloomfield, MI (US); Ashraf Abualfellat, Grand Blanc, MI (US); Christopher Ratliff, Linden, MI (US); Mohammadali Shahriari, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 45 days.

(21) Appl. No.: 18/738,454

(22) Filed: Jun. 10, 2024

(65) Prior Publication Data

US 2025/0378759 A1    Dec. 11, 2025

(51) Int. Cl.
| | |
|---|---|
| *G08G 1/16* | (2006.01) |
| *B60Q 9/00* | (2006.01) |
| *B60W 10/18* | (2012.01) |
| *B60W 10/20* | (2006.01) |

(Continued)

(52) U.S. Cl.
CPC ............. *G08G 1/167* (2013.01); *B60Q 9/008* (2013.01); *B60W 10/18* (2013.01); *B60W 10/20* (2013.01); *B60W 30/09* (2013.01); *B60W 30/18163* (2013.01); *B60W 2552/10* (2020.02); *B60W 2552/30* (2020.02); *B60W 2554/801* (2020.02);

(Continued)

(58) Field of Classification Search
CPC ....... G08G 1/167; B60Q 9/008; B60W 10/18;

B60W 10/20; B60W 30/09; B60W 30/18163; B60W 2552/10; B60W 2552/30; B60W 2554/801; B60W 2554/802; B60W 2554/804

See application file for complete search history.

(56) References Cited

U.S. PATENT DOCUMENTS

| | | | | |
|---|---|---|---|---|
| 12,384,365 B2 * | 8/2025 | Umeda | ........... | B60W 30/18163 |
| 2024/0116504 A1 * | 4/2024 | Umeda | ........... | B60W 30/18163 |

FOREIGN PATENT DOCUMENTS

| | | | | |
|---|---|---|---|---|
| DE | 102009007885 A1 | 8/2010 | | |
| DE | 102012000896 A1 * | 8/2012 | ............ | B60W 30/09 |
| DE | 102016106983 A1 | 10/2017 | | |

(Continued)

OTHER PUBLICATIONS

Machine Translation of Alexander's reference (DE-102021004191-A1) (Year: 2021).*

(Continued)

*Primary Examiner* — Tarek Elarabi
(74) *Attorney, Agent, or Firm* — CANTOR COLBURN LLP

(57) ABSTRACT

Examples described herein provide a method for detecting and avoiding a semi-truck. The method includes detecting the semi-truck in a lane adjacent to a host lane occupied by a host vehicle. The method further includes analyzing behavior of the semi-truck to determine a risk level associated with the semi-truck entering the host lane occupied by the host vehicle. The method further includes implementing a corrective action for the host vehicle based on the risk level associated with the semi-truck entering the host lane occupied by the host vehicle.

16 Claims, 4 Drawing Sheets

(51) Int. Cl.
    *B60W 30/09*       (2012.01)
    *B60W 30/18*       (2012.01)
(52) U.S. Cl.
    CPC . *B60W 2554/802* (2020.02); *B60W 2554/804*
                                   (2020.02)

(56)                 References Cited

FOREIGN PATENT DOCUMENTS

| | | | | |
|---|---|---|---|---|
| DE | 102017004112 A1 | * | 12/2017 | ............... B60Q 1/46 |
| DE | 102020204573 A1 | * | 10/2021 | ............ B60W 30/16 |
| DE | 102021004191 A1 | * | 11/2021 | ............ B60W 40/04 |

OTHER PUBLICATIONS

Machine Translation of Prakasha's reference (DE-102020204573-A1) (Year: 2020).*
Machine Translation of Zindel's reference (DE-102017004112-A1) (Year: 2017).*
Machine Translation of THOMASs reference (DE-102012000896-A1) (Year: 2012).*
German Office Action for German Application No. 102024121006.0; dated Oct. 14, 2024; 79 pages.

\* cited by examiner

SEMI-TRUCK DETECTION AND AVOIDANCE

The subject disclosure relates to vehicles, and in particular to detecting and avoiding a semi-truck.

Modern vehicles (e.g., a car, a motorcycle, a boat, or any other type of automobile) may be equipped with one or more cameras that provide back-up assistance, take images of the vehicle driver to determine driver drowsiness or attentiveness, provide images of the road as the vehicle is traveling for collision avoidance purposes, provide structure recognition (e.g., roadway signs, etc.), and/or the like. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors, such as a radio detecting and ranging (RADAR) device(s), LiDAR device(s), and/or the like for perception tasks. LiDAR involves using light (e.g., a pulsed laser) to measure distance to objects by emitting laser pulses, detecting a reflection (e.g., off of an object) of the emitted laser pulse, and measuring the time between the emission and the detection. The measured time can be used to determine the distance between the LiDAR device and the detected object. Perception tasks can include one or more of object detection, classification, tracking, lane detection, road sign recognition, and obstacle avoidance. Perception tasks are particularly useful for an autonomous vehicle or semi-autonomous vehicle to provide the vehicle with real-time awareness of its environment to make safe and informed driving decisions. Images from the one or more cameras of the vehicle can also be used for detecting objects, tracking targets, and/or the like, including combinations and/or multiples thereof.

SUMMARY

In one embodiment, a method for detecting and avoiding a semi-truck is provided. The method includes detecting the semi-truck in a lane adjacent to a host lane occupied by a host vehicle. The method further includes analyzing behavior of the semi-truck to determine a risk level associated with the semi-truck entering the host lane occupied by the host vehicle. The method further includes implementing a corrective action for the host vehicle based on the risk level associated with the semi-truck entering the host lane occupied by the host vehicle.

In addition to one or more of the features described herein, or as an alternative, further embodiments of the method may include that the risk level is determined at least in part on a situation awareness metric concerning a vehicle state of the host vehicle with respect to the semi-truck.

In addition to one or more of the features described herein, or as an alternative, further embodiments of the method may include that the situation awareness metric concerning the vehicle state of the host vehicle with respect to the semi-truck is a function of a velocity of the host vehicle, a difference in velocity between the velocity of the host vehicle and a velocity of the semi-truck, a lateral distance between the host vehicle and the semi-truck, a longitudinal distance between the host vehicle and the semi-truck, and a relative acceleration between the host vehicle and the semi-truck.

In addition to one or more of the features described herein, or as an alternative, further embodiments of the method may include that the risk level is determined at least in part on a situation awareness metric concerning a vehicle state of the host vehicle with respect to environmental conditions.

In addition to one or more of the features described herein, or as an alternative, further embodiments of the method may include that the situation awareness metric concerning the vehicle state of the host vehicle with respect to the environmental conditions is a function of a curvature of a road upon which the host vehicle and the semi-truck are operating and a difference in velocity between the velocity of the host vehicle and a velocity of another vehicle that is behind the host vehicle.

In addition to one or more of the features described herein, or as an alternative, further embodiments of the method may include that the environmental conditions include information about a road upon which the host vehicle and the semi-truck are operating.

In addition to one or more of the features described herein, or as an alternative, further embodiments of the method may include that the risk level is determined at least in part on a first situation awareness metric and a second situation awareness metric, the first situation awareness metric concerning a first vehicle state of the host vehicle with respect to the semi-truck, and the second situation awareness metric concerning a second vehicle state of the host vehicle with respect to environmental conditions.

In addition to one or more of the features described herein, or as an alternative, further embodiments of the method may include determining whether the risk level exceeds a threshold, wherein the corrective action is implemented responsive to determining that the risk level exceeds the threshold.

In addition to one or more of the features described herein, or as an alternative, further embodiments of the method may include that implementing the corrective action for the host vehicle includes initiating an automated lane change system to cause the host vehicle to perform a lane change.

In addition to one or more of the features described herein, or as an alternative, further embodiments of the method may include that implementing the corrective action for the host vehicle includes initiating an adaptive cruise control system to cause the host vehicle to adjust a velocity of the host vehicle.

In addition to one or more of the features described herein, or as an alternative, further embodiments of the method may include that implementing the corrective action for the host vehicle includes initiating a front collision alert system to generate an alert to an operator of the host vehicle warning of a potential front collision.

In addition to one or more of the features described herein, or as an alternative, further embodiments of the method may include that implementing the corrective action for the host vehicle includes initiating a collision imminent braking system to apply brakes of the host vehicle to reduce a velocity of the host vehicle.

In addition to one or more of the features described herein, or as an alternative, further embodiments of the method may include that implementing the corrective action for the host vehicle includes initiating an automated evasive steering system to adjust a trajectory of the host vehicle.

In another embodiment, a vehicle is provided. The vehicle includes a processing system having a memory including computer readable instructions and a processing device for executing the computer readable instructions. The computer readable instructions control the processing device to perform operations for limiting vehicle acceleration during turns. The operations include detecting a semi-truck in a lane adjacent to a host lane occupied by the host vehicle. The operations further include analyzing behavior of the semi-truck to determine a risk level associated with the semi-truck entering the host lane occupied by the host vehicle. The operations further include determining whether the risk level associated with the semi-truck entering the host lane occupied by the host vehicle exceeds a threshold. The operations further include, responsive to determining that the risk level associated with the semi-truck entering the host lane occupied by the host vehicle exceeds the threshold, implementing a corrective action for the host vehicle based on the risk level associated with the semi-truck entering the host lane occupied by the host vehicle. The operations further include, responsive to determining that the risk level associated with the semi-truck entering the host lane occupied by the host vehicle does not exceed the threshold, signaling to the semi-truck that merger is acceptable.

In addition to one or more of the features described herein, or as an alternative, further embodiments of the vehicle may include that the risk level is determined at least in part on a situation awareness metric concerning a vehicle state of the host vehicle with respect to the semi-truck, wherein the situation awareness metric is a function of a velocity of the host vehicle, a difference in velocity between the velocity of the host vehicle and a velocity of the semi-truck, a lateral distance between the host vehicle and the semi-truck, a longitudinal distance between the host vehicle and the semi-truck, and a relative acceleration between the host vehicle and the semi-truck.

In addition to one or more of the features described herein, or as an alternative, further embodiments of the vehicle may include that the risk level is determined at least in part on a situation awareness metric concerning a vehicle state of the host vehicle with respect to environmental conditions, wherein the situation awareness metric is a function of a curvature of a road upon which the host vehicle and the semi-truck are operating and a difference in velocity between the velocity of the host vehicle and a velocity of another vehicle that is behind the host vehicle.

In addition to one or more of the features described herein, or as an alternative, further embodiments of the vehicle may include that the risk level is determined at least in part on a first situation awareness metric and a second situation awareness metric, the first situation awareness metric concerning a first vehicle state of the host vehicle with respect to the semi-truck, and the second situation awareness metric concerning a second vehicle state of the host vehicle with respect to environmental conditions.

In addition to one or more of the features described herein, or as an alternative, further embodiments of the vehicle may include that implementing the corrective action for the host vehicle includes performing at least one of initiating an automated lane change to cause the host vehicle to perform a lane change, initiating an adaptive cruise control system to cause the host vehicle to adjust a velocity of the host vehicle, initiating a front collision alert system to generate an alert to an operator of the host vehicle warning of a potential front collision, initiating a collision imminent braking system to apply brakes of the host vehicle to reduce the velocity of the host vehicle, or initiating an automated evasive steering system to adjust a trajectory of the host vehicle.

In another embodiment a computer program product is provided. The computer program product includes a computer readable storage medium having program instructions embodied therewith, the program instructions executable by at least one processor to cause the at least one processor to perform operations. The operations include detecting a semi-truck in a lane adjacent to a host lane occupied by a host vehicle. The operations further include analyzing behavior of the semi-truck to determine a risk level associated with the semi-truck entering the host lane occupied by the host vehicle. The operations further include implementing a corrective action for the host vehicle based on the risk level associated with the semi-truck entering the host lane occupied by the host vehicle. The risk level is determined at least in part on a first situation awareness metric and a second situation awareness metric. The first situation awareness metric is a function of a velocity of the host vehicle, a difference in velocity between the velocity of the host vehicle and a velocity of the semi-truck, a lateral distance between the host vehicle and the semi-truck, a longitudinal distance between the host vehicle and the semi-truck, and a relative acceleration between the host vehicle and the semi-truck. The second situation awareness metric is a function of a curvature of a road upon which the host vehicle and the semi-truck are operating and a difference in velocity between the velocity of the host vehicle and a velocity of another vehicle that is behind the host vehicle.

In addition to one or more of the features described herein, or as an alternative, further embodiments of the computer program product may include that implementing the corrective action for the host vehicle includes performing at least one of initiating an automated lane change to cause the host vehicle to perform a lane change, initiating an adaptive cruise control system to cause the host vehicle to adjust a velocity of the host vehicle, initiating a front collision alert system to generate an alert to an operator of the host vehicle warning of a potential front collision, initiating a collision imminent braking system to apply brakes of the host vehicle to reduce the velocity of the host vehicle, or initiating an automated evasive steering system to adjust a trajectory of the host vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
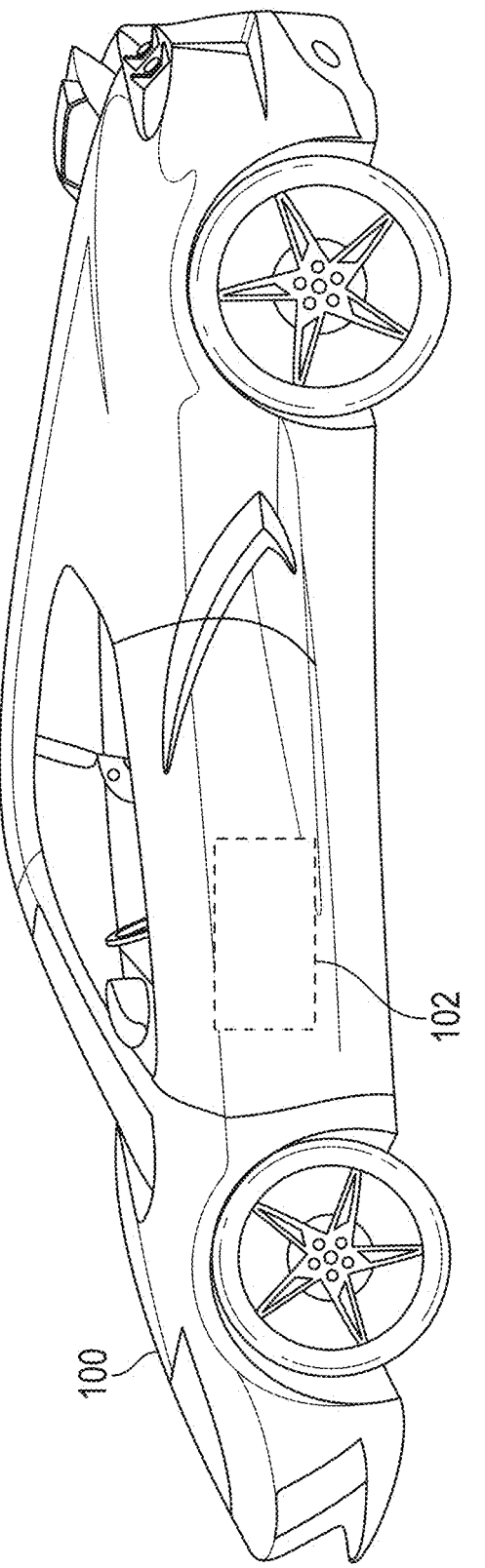
FIG. 1 is an illustration of a vehicle having a processing system for detecting and avoiding a semi-truck according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein relates to semi-truck detection and avoidance.

Vehicles may use advanced driver assistance systems (ADASs) to improve vehicle performance and enhance driving comfort by providing automating, adapting, or enhancing vehicle systems to provide better awareness, decision-making, and control. ADASs often use data from sensors (e.g., RADAR sensors, LiDAR sensor, proximity sensors, etc.), images from cameras, and/or the like, including combinations and/or multiples thereof, to make decisions and control one or more aspects of the vehicle.

One example of an ADAS is adaptive cruise control (ACC) system, which automatically adjusts the velocity of a host vehicle to maintain a safe following distance from another vehicle ahead of the vehicle. Another example of an ADAS is an automated lane change (ALC) system to cause the host vehicle to perform a lane change. Another example of an ADAS is a front collision alert (FCA) system to generate an alert to an operator of the host vehicle warning of a potential front collision. Another example of an ADAS is a collision imminent braking (CIB) system to apply brakes of the host vehicle to reduce a velocity of the host vehicle. Another example of an ADS is an automated evasive steering (AES) system to adjust the trajectory of the host vehicle.

Although various ADASs are useful for their intended purposes, such systems are not specifically designed to address risks associated with semi-trucks operating in the vicinity of the host vehicle (e.g., in an adjacent lane to the host vehicle, in the same lane as a host vehicle with the semi-truck ahead of or behind the host vehicle, etc.). When a vehicle encounters a swaying or encroaching semi-truck in a path of the vehicle, the remedial actions by ADASs, without overriding hands off lane centering, are limited.

A semi-truck, also known as a tractor-trailer, is a large vehicle primarily used for transporting goods over long distances. Semi-trucks generally include two main components: a tractor unit, which includes the engine and a compartment (e.g., cab) for an operator/driver; and a trailer connectable to the tractor unit, the trailer carrying cargo. Semi-trucks are useful in commerce, as they can haul substantial loads, and are a common sight on highways worldwide. With their powerful engines and multiple axles, semi-trucks provide the efficiency and capacity necessary for the transportation industry. However, semi-trucks introduce additional risks to nearby vehicles due to their size, weight, and power. For example, a semi-truck operator/driver may have a more limited field of view as compared to an operator/driver of a smaller vehicle, such as a passenger vehicle. A semi-truck, due to its weight and size, is generally not as maneuverable as a smaller vehicle, such as a passenger vehicle. For example, a semi-truck may take longer to come to a stop when applying the brakes relative to a passenger vehicle.

One or more embodiments described herein address these and other shortcomings by detecting and avoiding semi-trucks. More particularly, one or more embodiments described herein detects a semi-truck in a lane adjacent to a host lane occupied by a host vehicle, analyzes behavior of the semi-truck to determine a risk level associated with the semi-truck entering the host lane occupied by the host vehicle, and implements a corrective action for the host vehicle based on the risk level. According to one or more embodiments, implementing the corrective action can be performed by or in conjunction with one or more ADAS (e.g., an ACC system, an ALC system, an FCA system, a CIB system, an AES system, and/or the like, including combinations and/or multiples thereof).

According to one or more embodiments, a scoring method is provided that can rank how severely the semi-truck is swaying or encroaching on a lane of the host vehicle. The host vehicle can then intelligently decide, using one or more of the embodiments described herein, what corrective action to take (e.g., whether to change lanes and at what speed depending on the threat, whether to reduce velocity to allow the semi-truck to merge, whether to continue course in the host lane, and/or the like, including combinations and/or multiples thereof). The sensors of the host vehicle can be used to collect data about the semi-truck and the environment relative to the host vehicle. The host vehicle can fuse the sensor data to analyze the behavior of the semi-truck and to determine which corrective action to take. Depending on behavior of the semi-truck, one or more embodiments described herein provide for modifying the lateral and/or longitudinal controls of the host vehicle to behave more closely to hands on driving behaviors. According to one or more embodiments, when the host vehicle determines there is a safe gap in front of the host vehicle for a passing semi-truck to merge into, the host vehicle can signal to the semi-truck that it acknowledges the merge, such as by flashing high beams, honking a horn, sending an electronic communication, and/or the like, including combinations and/or multiples thereof.

According to one or more embodiments, sensor data (e.g., image/video data, radar data, vehicle telemetry data, and/or the like, including combinations and/or multiples thereof) can be fused and used to modify lateral and longitudinal control in level 2 hands free driving features of autonomous or semi-autonomous vehicles in reaction to merging and excessively swaying semi-trucks. This approach reduces the risk of collisions and reduces the necessity for driver intervention when using level 2 ADAS features.

It should be appreciated that the functioning of a vehicle implementing one or more of the embodiments described herein is improved. For example, a vehicle can identify and mitigate risks associated with operating the vehicle in proximity to a semi-truck by evaluating the behavior of the semi-truck. This results in improved operation of the vehicle by decreasing the likelihood of driver override when encountering semi-trucks, deceasing collision risks, and improving ride quality and comfort.

FIG. 1 is an illustration of a vehicle 100 having a processing system 102 for detecting and avoiding a semi-truck according to one or more embodiments. The vehicle 100, which is also referred to herein as a "host vehicle," can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. According to one or more embodiments, the vehicle 100 is an autonomous or semi-autonomous vehicle. An autonomous vehicle is a vehicle that has self-driving capabilities.

According to one or more embodiments, the vehicle 100 includes the processing system 102, which provides for detecting and avoiding a semi-truck. Further features of the processing system 102 are now described with reference to FIGS. 2-5.

Figure 2:
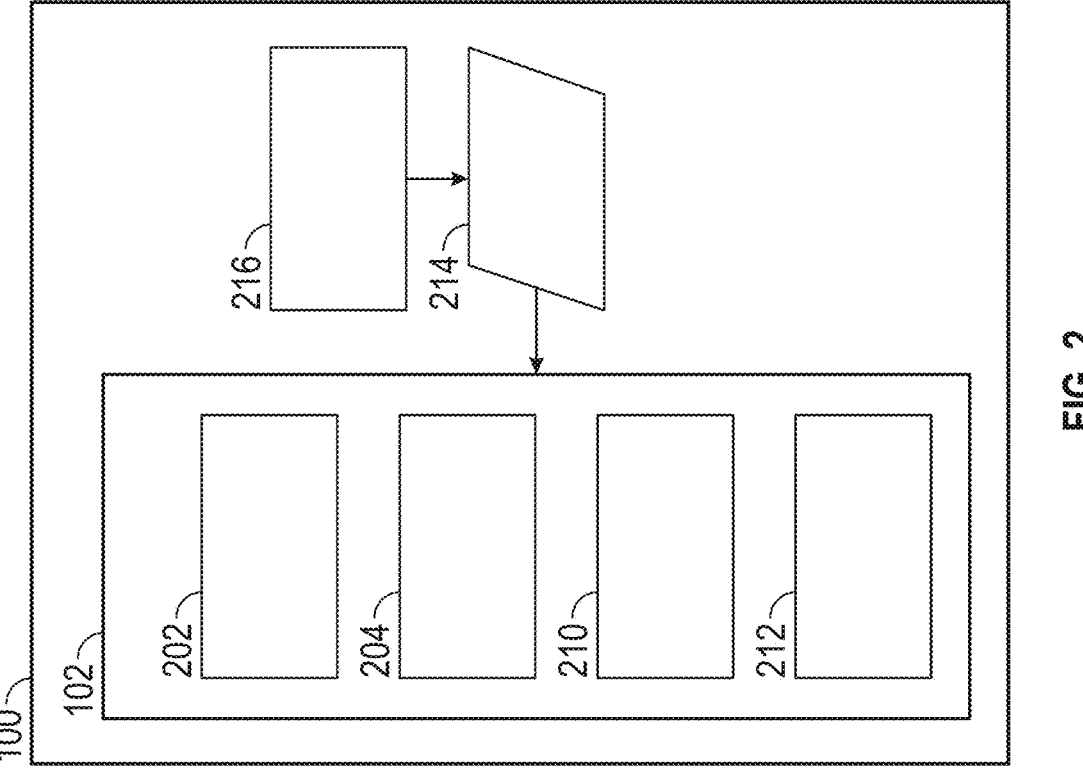
FIG. 2 is a block diagram of the processing system of FIG. 1 for detecting and avoiding a semi-truck according to one or more embodiments.

Particularly, FIG. 2 is a block diagram of the processing system 102 of FIG. 1 for detecting and avoiding a semi-truck according to one or more embodiments. The processing system 102 includes a processing device 202, a memory 204, and a detection and analysis engine 210 for semi-truck detection and risk analysis. It should be appreciated that the processing system 102 can be any device suitable for performing battery state health estimation. For example, the processing system 102 can be a device implemented in or otherwise associated with the vehicle 100. As another example, the processing system 102 can be a smartphone, tablet computer, laptop computer, desktop computer, wearable computing device, and/or the like, including combinations and/or multiples thereof.

The processing device 202 is any suitable processing circuitry for processing data and/or instructions. The processing device 202 is an example of one or more of the processing devices 621 of FIG. 6, as described in more detail herein.

The memory 204 is any suitable device for storing data and/or instructions. The memory 204 is an example of one or more of the system memory 622, the random access memory 623, and/or the read-only memory 624 of FIG. 6, as described in more detail herein.

The detection and analysis engine 210 uses sensor data 214 to detect a semi-truck and to analyze risk associated with the semi-truck. The sensor data 214 can include data from one or more sensor devices 216 associated with the vehicle 100. The sensor devices 216 can include one or more cameras, one or more LiDAR devices, one or more proximity sensors, one or more RADAR devices, one or more inertial measurement units (IMUs) (e.g., to provide vehicle telemetry information), and/or the like, including combinations and/or multiples thereof. According to one or more embodiments, the detection and analysis engine 210 uses the sensor data 214 to detect a semi-truck in a lane adjacent to a host lane occupied by a host vehicle (e.g., the vehicle 100). After detecting a semi-truck, the detection and analysis engine 210 analyzes the behavior of the semi-truck to determine a risk level associated with the semi-truck entering the host lane occupied by the host vehicle. The detection and analysis engine 210 can then cause a corrective action to be initiated, such as using an ADAS 212 (e.g., an ACC system, an ALC system, an FCA system, a CIB system, an AES system, and/or the like, including combinations and/or multiples thereof), for the host vehicle based on the risk level. Further aspects and features of the detection and analysis engine 210 and the ADAS 212 are described herein with respect to FIGS. 3, 4A, 4B, and 5.

The various components, modules, engines, etc. described regarding FIG. 2 (e.g., the detection and analysis engine 210, the ADAS 212) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the various components, modules, engines, etc. described herein can be a combination of hardware and programming. The programming can be processor executable instructions stored on a tangible memory, and the hardware can include the processing device 202 for executing those instructions. Thus, a system memory (e.g., memory 204) can store program instructions that, when executed by the processing device 202, implement the engines described herein. Other components, modules, engines, etc. can also be utilized to include other features and functionality described in other examples herein.

The processing system 102, using the detection and analysis engine 210, provides the following features: a systematic methodology to effectively and robustly detect swaying and encroaching semi-trucks; a method to effectively quantify the hazard associated with the semi-trucks and associate a risk index to make an ADAS decision to minimize the risk for the host vehicle; a control reaction based on developed risk index (e.g., decelerate host vehicle if semi-truck initiates merge into host lane and collision risk is assessed as high; assess executing an ALC if detected semi-truck sway/encroachment is assessed as unsafe; detects passing semi-truck turn signal in direction of host vehicle lane, then requests high beams to flash when assessed risk of semi-truck merging into host lane is sufficiently low (e.g., below a threshold); driver indication on instrument panel that swaying/encroaching semi-truck is present (vehicle ahead telltale)).

Figure 3:
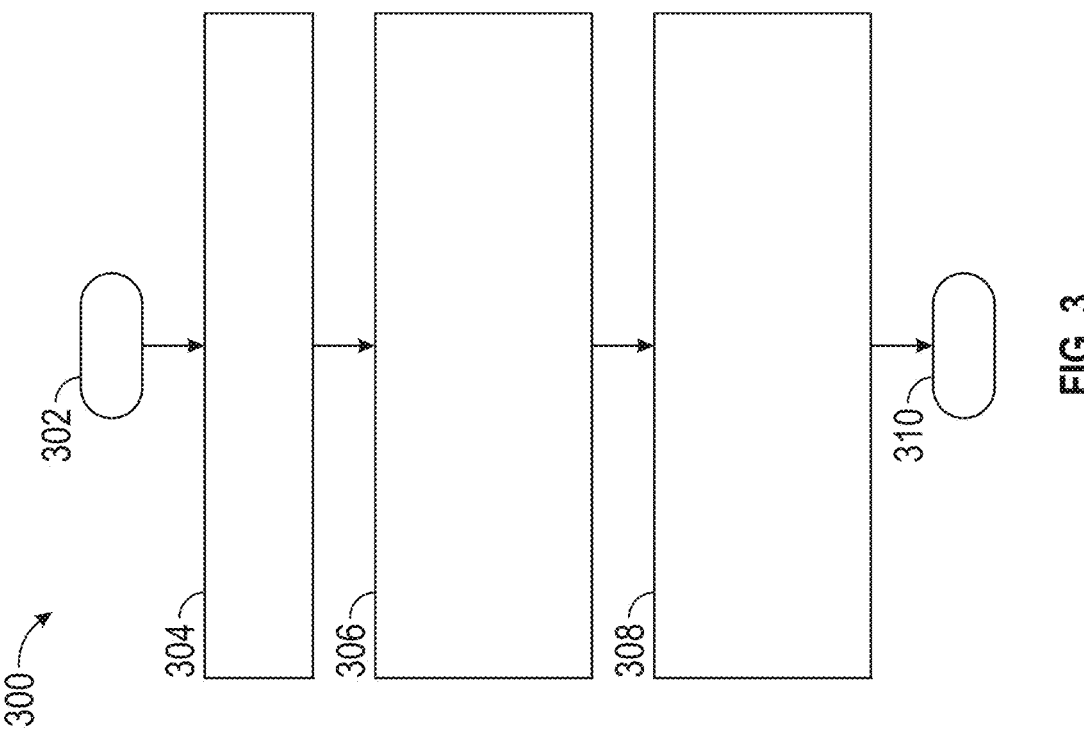
FIG. 3 is a flow diagram of a method for detecting and avoiding a semi-truck according to one or more embodiments.

Turning now to FIG. 3, a flow diagram of a method 300 for detecting and avoiding a semi-truck is provided according to one or more embodiments. The method 300 can be implemented using any suitable system or device. For example, the method 300 can be implemented using the processing system 102 of FIGS. 1 and 2, by the processing system 600 of FIG. 6, and/or the like, including combinations and/or multiples thereof. The method 300 is now described with reference to FIGS. 1, 2, 4, and 5 but is not so limited.

The method 300 begins at block 302 and proceeds to block 304. At block 304, the processing system 102 (e.g., using the detection and analysis engine 210) detects a semi-truck in a lane adjacent to a host lane occupied by a host vehicle (e.g., the vehicle 100). To detect the semi-truck, the processing system 102 uses sensor data 214 from one or more sensor devices 216 (e.g., cameras, LiDAR devices, proximity sensors, LiDAR devices, IMUs, and/or the like, including combinations and/or multiples thereof) associated with the vehicle 100.

For example, a camera can visually detect a semi-truck by capturing images/video that include the semi-truck. The processing system 102 can perform image processing on the images/video to extract information about the semi-truck, such as whether a turn signal light is illuminated, lateral movement and frequency of the semi-truck (relative to the vehicle 100), longitudinal distance to the semi-truck (from the vehicle 100), and/or the like, including combinations and/or multiples thereof.

As another example, a RADAR device can collect data about the semi-truck, such as lateral movement and frequency of the semi-truck (relative to the vehicle 100), longitudinal distance to the semi-truck (from the vehicle 100), and/or the like, including combinations and/or multiples thereof.

As yet another example, an IMU can provide telemetry information such as a trajectory of the host vehicle (e.g., the vehicle 100), movement optimization information, velocity information for the host vehicle, and/or the like, including combinations and/or multiples thereof.

In some embodiments, the processing system 102 can perform road object fusion on the sensor data 214 (e.g., images/video from a camera, RADAR data from a RADAR device, trajectory information from an IMU, and/or the like, including combinations and/or multiples thereof) to combine information from different cameras/sensors to detect and track objects. Performing road object fusion provides more accurate object detection because multiple sensor sources are used.

At block 306, the processing system 102 (e.g., using the detection and analysis engine 210) analyzes the behavior of the semi-truck to determine a risk level associated with the semi-truck entering the host lane occupied by the host vehicle (e.g., the vehicle 100). For example, the processing system 102 uses the sensor data 214 to analyze the behavior of the semi-truck and determine what risk level the semi-truck poses to the host vehicle. For example, if no semi-truck is observed, no risk is present. As another example, if a semi-truck is detected and it is determined (e.g., using image/video data from a camera) that a turn signal light is illuminated, it may be determined that the semi-truck poses a moderate risk level. As yet another example, if a semi-truck is detected and it is determined (e.g., using image/video data from a camera or RADAR data from a RADAR device) that a trailer of the semi-truck is swaying, it may be determined that the semi-truck poses a high risk level. Similarly, as another example, if a semi-truck is detected and it is determined (e.g., using image/video data from a camera or RADAR data from a RADAR device) that the semi-truck is about to enter the host lane of the host vehicle (e.g., the vehicle 100), it may be determined that the semi-truck poses a high risk level.

According to one or more embodiments, the risk assessment includes preforming object detection (e.g., detecting the semi-truck and/or other vehicles), performing object categorization (e.g., categorizing a detected vehicle as a semi-truck or other type of non-semi-truck vehicle), determining an environment and road type (e.g., determining information about a road upon which the vehicle 100 is traveling, such as a number of lanes), determining a risk level for each lane of the road (described in more detail herein), and determining a risk type (e.g., trailer sway, semi-truck moving into lane of host vehicle), and/or the like, including combinations and/or multiples thereof.

According to one or more embodiments, the risk level is determined at least in part on a situation awareness metric (p) concerning a vehicle state of the host vehicle with respect to the semi-truck. For example, the situation awareness metric (p) concerning the vehicle state of the host vehicle with respect to the semi-truck is a function of one or more of a velocity of the host vehicle ($v_h$), a difference in velocity between the velocity of the host vehicle and a velocity of the semi-truck ($\Delta v_{h,j}$), a lateral distance between the host vehicle and the semi-truck ($\Delta x_{h,j}$), a longitudinal distance between the host vehicle and the semi-truck ($\Delta y_{h,j}$), and a relative acceleration between the host vehicle and the semi-truck ($\Delta \dot{v}_{h,j}$). As used herein, "h" represents the vehicle 100 (e.g., host vehicle), "j" represents the semi-truck, and "i" represents another vehicle.

According to one or more embodiments, the risk level is determined at least in part on a situation awareness metric (q) concerning a vehicle state of the host vehicle with respect to environmental conditions. For example, the situation awareness metric (q) concerning the vehicle state of the host vehicle with respect to the environmental conditions is a function of a curvature of a road upon which the host vehicle and the semi-truck are operating ($\rho_r$) and a difference in velocity between the velocity of the host vehicle and a velocity of another vehicle that is behind the host vehicle ($\Delta v_{h,i}$). According to one or more embodiments, the environmental conditions include information (e.g., road geometry, bank, merge lanes, and/or the like, including combinations and/or multiples thereof) about a road upon which the host vehicle and the semi-truck are operating.

According to one or more embodiments, the risk level is determined at least in part on a first situation awareness metric (e.g., the situation awareness metric (p) concerning a vehicle state of the host vehicle with respect to the semi-truck) and a second situation awareness metric (e.g., the situation awareness metric (q) concerning a vehicle state of the host vehicle with respect to environmental conditions). The situation awareness metric (p) concerning a vehicle state of the host vehicle with respect to the semi-truck indicates whether the truck is approaching the host vehicle. The situation awareness metric (q) concerning a vehicle state of the host vehicle with respect to environmental conditions indicates, for example, how much room the host vehicle has to move within its operating environment (e.g., whether the host vehicle trapped or there is an empty lane adjacent to the host vehicle; whether the host vehicle is on a bridge, whether the road is a divided road, and/or the like, including combinations and/or multiples thereof).

At block 308, the processing system 102 (e.g., using the ADAS 212) implements a corrective action for the host vehicle based on the risk level associated with the semi-truck entering the host lane occupied by the host vehicle. It should be appreciated that, according to one or more embodiments, the detection and analysis engine 210 initiates the corrective action by sending a signal or message to the ADAS 212 to cause the ADAS 212 to implement the corrective action. The signal or message can include information about the corrective action, such what action to take, properties associated with the corrective action (e.g., an amount of velocity change, a lane into which to steer the vehicle 100, and/or the like, including combinations and/or multiples thereof).

Depending on the risk level, the vehicle 100 can implement a corrective action to mitigate the risk associated with the semi-truck. For example, the vehicle 100 can identify a lane with a lower risk, can initiate an ALC maneuver, can adjust the velocity of the vehicle 100, can perform a lateral control blend path shape action, and/or the like, including combinations and/or multiples thereof. Other non-limiting examples of correction actions include: initiating an ALC to cause the host vehicle to perform a lane change; initiating an ACC system to cause the host vehicle to adjust a velocity of the host vehicle; initiating a FCA system to generate an alert to an operator of the host vehicle warning of a potential front collision; initiating a CIB system to apply brakes of the host vehicle to reduce the velocity of the host vehicle; and/or initiating an AES system to adjust a trajectory of the host vehicle. Which corrective action to take depends on the risk level, and the selection of which corrective action to implement for each different risk level is described in more detail with respect to FIG. 5.

With continued reference to FIG. 3, the method 300 terminates at block 310. However, according to one or more embodiments, the method 300 can repeat by returning to block 302 to continue detecting semi-trucks.

According to one or more embodiments as described herein, the method 300 further includes determining whether the risk level exceeds a threshold. In such cases, the corrective action is implemented responsive to determining that the risk level exceeds the threshold. According to one or more embodiments, multiple thresholds can be used (e.g., a lower threshold and a higher threshold), where different corrective actions are implemented depending on which threshold is exceeded. For example, if the risk level exceeds the lower threshold without exceeding the higher threshold, a first type of corrective action can be taken (e.g., ALC). However, if the risk level exceeds the lower and higher thresholds, a second type of correction action can be taken (e.g., CIB), which may be more significant than the first type corrective action.

According to one or more embodiments, if it is determined that the risk level associated with the semi-truck entering the host lane occupied by the host vehicle does not exceed the threshold, the vehicle 100 may signal to the semi-truck that merger is acceptable. For example, the vehicle 100 may flash its headlights, honk its horn, send an electronic message to the semi-truck, and/or the like, including combinations and/or multiples thereof.

Additional processes also may be included, and it should be understood that the processes depicted in FIG. 3 represent illustrations, and that other processes may be added, or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processing device 202 of FIG. 2, the processor(s) 621 of FIG. 6, and/or the like, including combinations and/or multiples thereof) of a computing system (e.g., the processing system 102 of FIGS. 1 and 2, the processing system 600 of FIG. 6, and/or the like, including combinations and/or multiples thereof), cause the processor to perform the processes described herein.

Figures 4, 5:
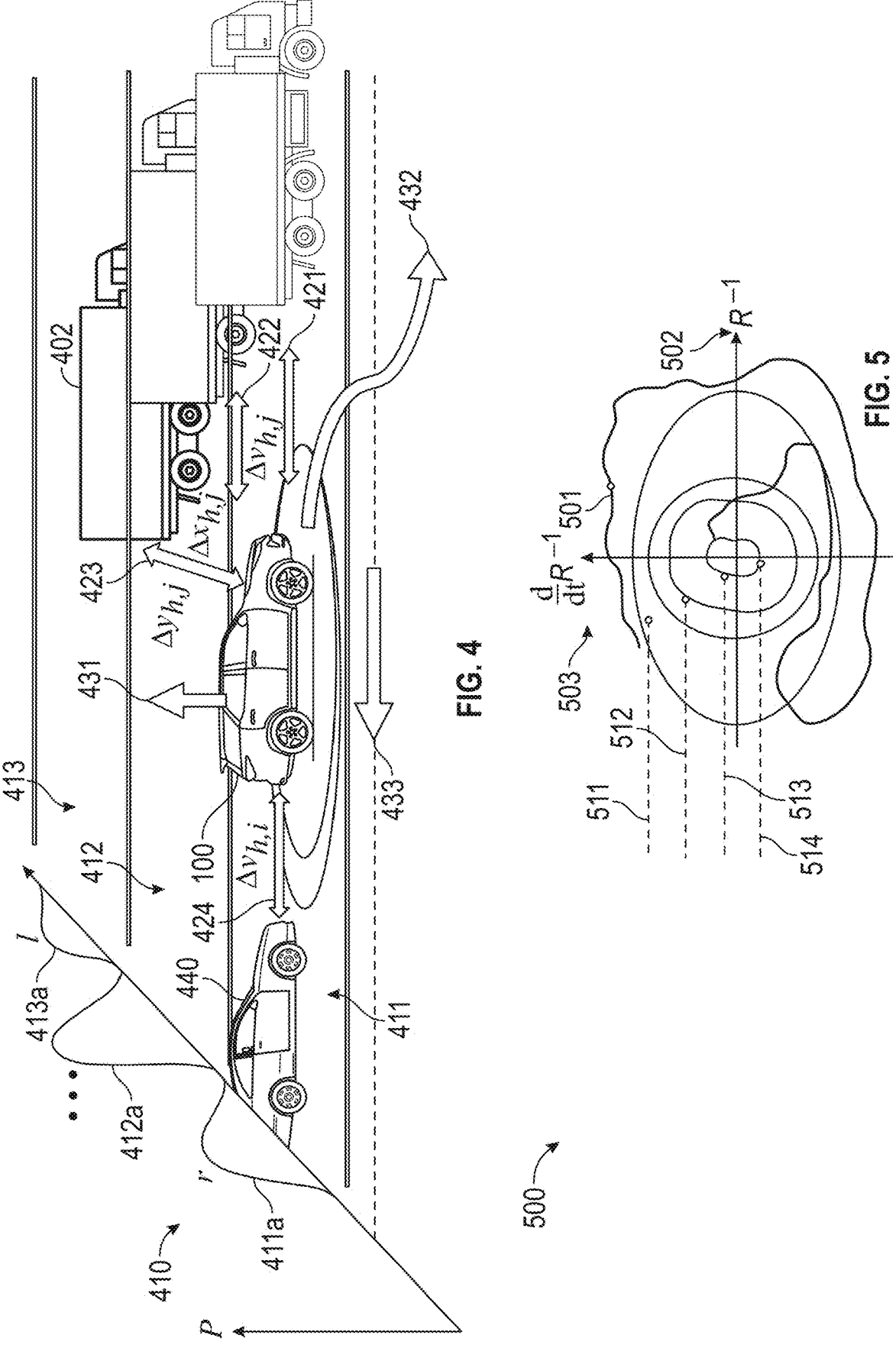
FIG. 4 is example of the vehicle of FIG. 1 encountering a semi-truck according to one or more embodiments.
FIG. 5 depicts a graph of a risk index and associated corrective action thresholds according to one or more embodiments.

FIG. 4 is an example of the vehicle 100 (e.g., host vehicle) encountering a semi-truck 402 according to one or more embodiments. In this example, the vehicle 100 occupies a first lane 411 and the semi-truck 402 occupies a second lane 412. A third lane 413 is unoccupied. As shown in FIG. 4, the semi-truck 402 is merging from the second lane 412 to the first lane 411 in front of the vehicle 100.

As described herein, the vehicle 100 can detect the presence and behavior of the semi-truck 402 using the sensor data 214 from sensor devices 216. The detection and analysis engine 210 analyzes behavior of the semi-truck 402 to determine the risk level associated with the semi-truck 402 entering the host lane (e.g., the first lane 412) occupied by the host vehicle (e.g., the vehicle 100). According to one or more embodiments, the risk level is determined at least in part on a first situation awareness metric (e.g., the situation awareness metric (p) concerning a vehicle state of the host vehicle with respect to the semi-truck) and a second situation awareness metric (e.g., the situation awareness metric (q) concerning a vehicle state of the host vehicle with respect to environmental conditions). In particular, the risk for the host vehicle relative to the semi-truck 402 (denoted "j") (R(j)) can be expressed using the following equation:

$$R(j) = \prod_{\substack{i=1:n \\ j=1:m \\ r=1:l}} p(v_h, \Delta v_{h,j}, \Delta x_{h,j}, \Delta \dot{v}_{h,j} \ \ldots \ ) q(\rho_r, \Delta v_{h,i}, \ldots \ ).$$

As described herein, the situation awareness metric (p) concerning the vehicle state of the host vehicle with respect to the semi-truck is a function of one or more of a velocity of the host vehicle $(v_h)$, a difference in velocity between the velocity of the host vehicle and a velocity of the semi-truck $(\Delta v_{h,j})$ (arrow 421), a lateral distance between the host vehicle and the semi-truck $(\Delta x_{h,j})$ (arrow 422), a longitudinal distance between the host vehicle and the semi-truck $(\Delta y_{h,j})$ (arrow 423), and a relative acceleration between the host vehicle and the semi-truck $(\Delta \dot{v}_{h,j})$. As used herein, "h" represents the vehicle 100 (e.g., host vehicle), "j" represents the semi-truck, and "i" represents another vehicle. The situation awareness metric (q) concerning the vehicle state of the host vehicle with respect to the environmental conditions is a function of a curvature of a road upon which the host vehicle and the semi-truck are operating $(\rho_r)$ and a difference in velocity between the velocity of the host vehicle and a velocity of another vehicle that is behind the host vehicle $(\Delta v_{h,i})$ (arrow 424).

Expressed another way, the risk for a single semi-truck (e.g., the semi-truck 402) is:

$$R(1) = \underbrace{\frac{x_0}{\Delta x_{h,1}} \cdot \Delta \dot{y}_{h,1} \cdot e^{-\frac{\Delta v_{h,1}}{v_0}}}_{p} \cdot \underbrace{\frac{v_h}{v_0} \sum_{k=1}^{n} \frac{q_0}{\Delta x_{h,i}}}_{q}.$$

This expression can be simplified as:

$$R(1) = \underbrace{\frac{x_0}{\Delta x_{h,1}}}_{p} \cdot \underbrace{\rho_r}_{q}.$$

The value $\Delta \dot{y}$ describes the relative lateral motion of the semi-truck 402 relative to the host lane (e.g., the first lane 411 occupied by the vehicle 100) and calculated by looking at consequent relative motion of the semi-truck 402 to the vehicle 100. The value $\Delta x_{ij}$ describes the longitudinal distance of the $i^{th}$ vehicle (e.g., the vehicle 440) to the vehicle 100. The value $\Delta v_{1j}$ describes the relative velocity of the semi-truck 402 relative to the vehicle 100. The values $x_0$, $v_0$, $q_0$ represent design parameters that are used to normalize the velocity and other states to provide comparable quantified risk indices.

According to one or more embodiments, the detection and analysis engine 210 can determine a lane level probabilistic risk index for each of the lanes 411-413, shown by the graph 410 in FIG. 4. For example, the detection and analysis engine 210 can determine a first lane level probabilistic risk index 411a the first lane 411, a second lane level probabilistic risk index 412a the second lane 412, and a third lane level probabilistic risk index 413a the first lane 413. Each of the lane level probabilistic risk indices indicate a risk level for the respective lane relative to the vehicle 100 and can be used to determine when to take a corrective action and/or what corrective action(s) to take.

Depending on the risk level, the vehicle 100 can implement one or more corrective actions as described herein.

FIG. 4 illustrates three possible corrective actions, although others are possible: an ALC 431, an evasive steer 432, and an ACC gap adjust 433.

FIG. 5 depicts a graph 500 of a risk index 501 and associated corrective action thresholds according to one or more embodiments. The graph 500 plots inverse risk 502 along the x-axis versus derivative of the inverse risk 503 along the y-axis. By plotting the inverse risk 502 (rather than the risk factor without performing inversion), the graph 500 plots higher nearer the intersection of the x-axis and y-axis, with decreasing risks extending therefrom. Depending on the risk level, shown in the graph 500, one or more corrective actions can be taken, such as an ALC activation zone 511, an ACC gap and set speed adjust 512, a FCA and CIB 513 and an AES 514.

According to one or more embodiments, to calculate a directional ALC command (A(j)) based on the risk index (for ALC activation zone 511), the following equation can be used to explicitly command which direction to go to minimize risk:

$$A(j) = \text{sgn}(r_j - r_h) \cdot (R - R_{ALC})^2 \left( \frac{d}{dt} R - \frac{d}{dt} R_{ALC} \right)^2.$$

According to one or more embodiments, to calculate the gap adjustment (for ACC gap and set speed adjust 512), the following equation can be used to explicitly adjust the gap to minimize risk:

$$G(j) = G_0 + G_p(R) \left( \text{sgn} \left( \frac{d}{dt} R + \epsilon_0 \right) + 1 \right).$$

The linear form of $G_p(R)$ can be expressed as:

$$G(j) = G_0 + \frac{R}{2R_0} \left( \text{sgn} \left( \frac{d}{dt} R + \epsilon_0 \right) + 1 \right).$$

This approach explicitly maintains an original gap if the detected risk is recovering, where $G_0$ is the original gap setting and $G_P$ is the gain that translates the normalized risk index to a meaningful gap setting.

Figure 6:
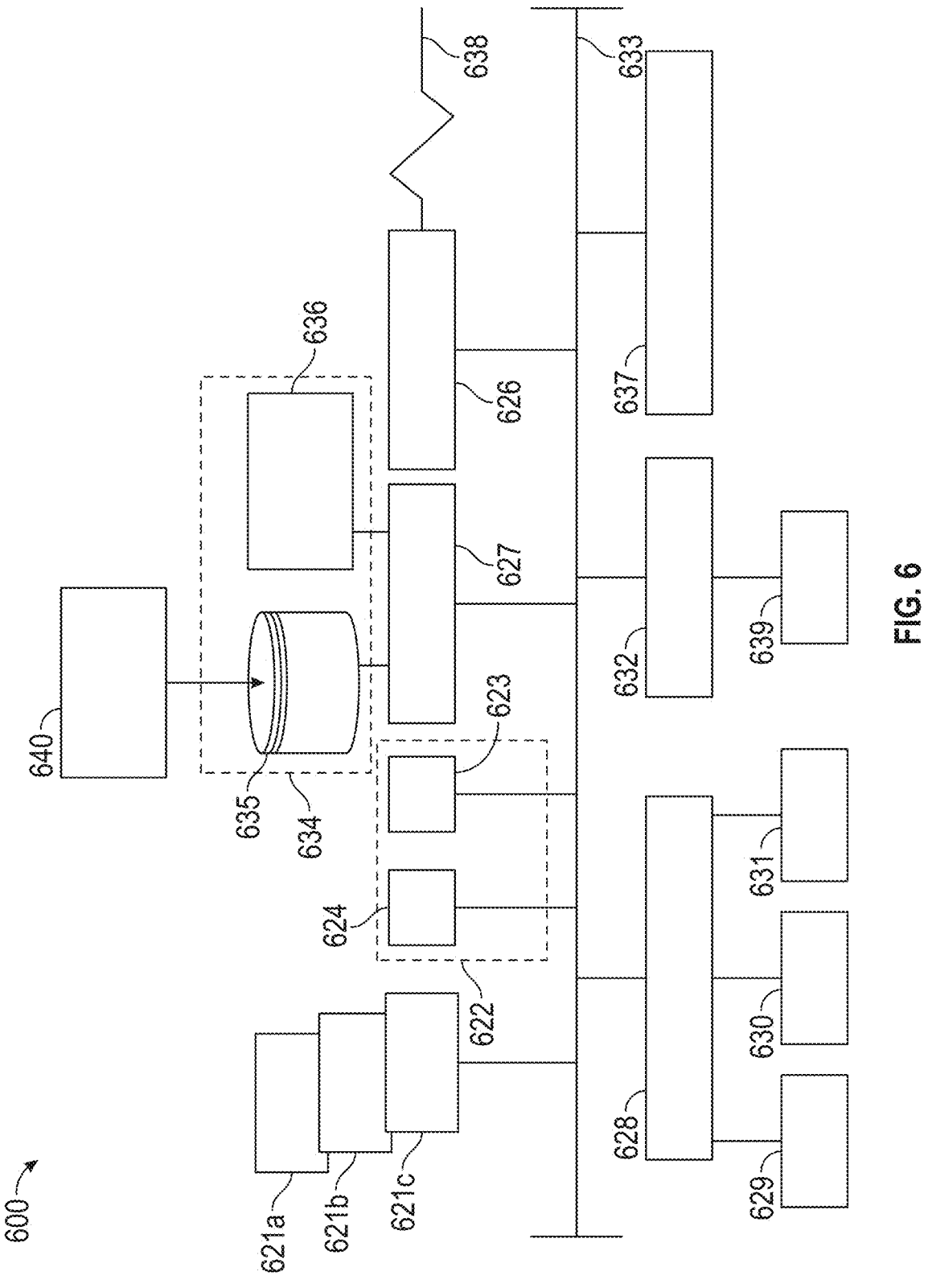
FIG. 6 is a block diagram of a processing system for implementing one or more embodiments described herein.

It is understood that one or more embodiments described herein is capable of being implemented in conjunction with any other type of computing environment now known or later developed. For example, FIG. 6 depicts a block diagram of a processing system 600 for implementing the techniques described herein. In accordance with one or more embodiments described herein, the processing system 600 is an example of a cloud computing node of a cloud computing environment. In examples, processing system 600 has one or more central processing units (referred to also as "processors" or "processing resources" or "processing devices") 621a, 621b, 621c, etc. (collectively or generically referred to as processor(s) 621 and/or as processing device(s) 621). In aspects of the present disclosure, each processor 621 can include a reduced instruction set computer (RISC) microprocessor. Processors 621 are coupled to a system memory 622 and/or various other components via a system bus 633. The system memory 622 can include one or more temporary and/or persistent memory devices, such as a random access memory (RAM) 623, a read-only memory (ROM) 624, and/or the like, including combinations and/or multiples thereof. The system bus 633 may include a basic input/ output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 635 and/or a storage device 636 or any other similar component. I/O adapter 627, hard disk 635, and storage device 636 are collectively referred to herein as mass storage 634. Operating system 640 for execution on processing system 600 may be stored in mass storage 634. The network adapter 626 interconnects system bus 633 with an outside network 638 enabling processing system 600 to communicate with other such systems.

A display (e.g., a display monitor) 639 is connected to system bus 633 by display adapter 632, which may include a graphics adapter to improve the performance of graphics intensive applications and a video controller. In one aspect of the present disclosure, adapters 626, 627, and/or 632 may be connected to one or more I/O buses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit (GPU) 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing and has a highly parallel structure that makes it more effective than general-purpose CPUs for algorithms where processing of large blocks of data is done in parallel.

Thus, as configured herein, processing system 600 includes processing capability in the form of processors 621, storage capability including the system memory 622 and mass storage 634, input means such as keyboard 625 and mouse 630, and output capability including speaker 631 and display 639. In some aspects of the present disclosure, a portion of system memory 622 and mass storage 634 collectively store the operating system 640 to coordinate the functions of the various components shown in processing system 600.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for detecting and avoiding a semi-truck, the method comprising:

detecting the semi-truck in a lane adjacent to a host lane occupied by a host vehicle;

analyzing behavior of the semi-truck to determine a risk level associated with the semi-truck entering the host lane occupied by the host vehicle, wherein the risk level is determined at least in part on a situation awareness metric concerning a vehicle state of the host vehicle with respect to the semi-truck, and wherein the situation awareness metric concerning the vehicle state of the host vehicle with respect to the semi-truck is a function of a velocity of the host vehicle, a difference in velocity between the velocity of the host vehicle and a velocity of the semi-truck, a lateral distance between the host vehicle and the semi-truck, a longitudinal distance between the host vehicle and the semi-truck, and a relative acceleration between the host vehicle and the semi-truck, wherein the risk level is determined at least in part on a situation awareness metric concerning a vehicle state of the host vehicle with respect to environmental conditions, wherein the situation awareness metric concerning the vehicle state of the host vehicle with respect to the environmental conditions is a function of a curvature of a road upon which the host vehicle and the semi-truck are operating and a difference in velocity between the velocity of the host vehicle and a velocity of another vehicle that is behind the host vehicle; and implementing a corrective action for the host vehicle based on the risk level associated with the semi-truck entering the host lane occupied by the host vehicle.

2. The computer-implemented method of claim 1, wherein the risk level is determined at least in part on a first situation awareness metric and a second situation awareness metric, the first situation awareness metric concerning a first vehicle state of the host vehicle with respect to the semi-truck, and the second situation awareness metric concerning a second vehicle state of the host vehicle with respect to environmental conditions.

3. The computer-implemented method of claim 1, further comprising determining whether the risk level exceeds a threshold, wherein the corrective action is implemented responsive to determining that the risk level exceeds the threshold.

4. The computer-implemented method of claim 1, wherein implementing the corrective action for the host vehicle comprises initiating an automated lane change system to cause the host vehicle to perform a lane change.

5. The computer-implemented method of claim 1, wherein implementing the corrective action for the host vehicle comprises initiating an adaptive cruise control system to cause the host vehicle to adjust the velocity of the host vehicle.

6. The computer-implemented method of claim 1, wherein implementing the corrective action for the host vehicle comprises initiating a front collision alert system to generate an alert to an operator of the host vehicle warning of a potential front collision.

7. The computer-implemented method of claim 1, wherein implementing the corrective action for the host vehicle comprises initiating a collision imminent braking system to apply brakes of the host vehicle to reduce the velocity of the host vehicle.

8. The computer-implemented method of claim 1, wherein implementing the corrective action for the host vehicle comprises initiating an automated evasive steering system to adjust a trajectory of the host vehicle.

9. A host vehicle comprising:

a processing system, the processing system comprising:

a memory comprising computer readable instructions; and a processing device for executing the computer readable instructions, the computer readable instructions controlling the processing device to perform operations for limiting vehicle acceleration during turns, the operations comprising:

detecting a semi-truck in a lane adjacent to a host lane occupied by the host vehicle;

analyzing behavior of the semi-truck to determine a risk level associated with the semi-truck entering the host lane occupied by the host vehicle;

determining whether the risk level associated with the semi-truck entering the host lane occupied by the host vehicle exceeds a threshold, wherein the risk level is determined at least in part on a situation awareness metric concerning a vehicle state of the host vehicle with respect to the semi-truck, wherein the situation awareness metric is a function of a velocity of the host vehicle, a difference in velocity between the velocity of the host vehicle and a velocity of the semi-truck, a lateral distance between the host vehicle and the semi-truck, a longitudinal distance between the host vehicle and the semi-truck, and a relative acceleration between the host vehicle and the semi-truck, wherein the risk level is determined at least in part on a situation awareness metric concerning a vehicle state of the host vehicle with respect to environmental conditions, wherein the situation awareness metric concerning the vehicle state of the host vehicle with respect to the environmental conditions is a function of a curvature of a road upon which the host vehicle and the semi-truck are operating and a difference in velocity between the velocity of the host vehicle and a velocity of another vehicle that is behind the host vehicle; and responsive to determining that the risk level associated with the semi-truck entering the host lane occupied by the host vehicle exceeds the threshold, implementing a corrective action for the host vehicle based on the risk level associated with the semi-truck entering the host lane occupied by the host vehicle; and responsive to determining that the risk level associated with the semi-truck entering the host lane occupied by the host vehicle does not exceed the threshold, signaling to the semi-truck that merger is acceptable.

10. The host vehicle of claim 9, wherein the risk level is determined at least in part on a first situation awareness metric and a second situation awareness metric, the first situation awareness metric concerning a first vehicle state of the host vehicle with respect to the semi-truck, and the second situation awareness metric concerning a second vehicle state of the host vehicle with respect to environmental conditions.

11. The host vehicle of claim 9, wherein implementing the corrective action for the host vehicle comprises performing at least one of:

initiating an automated lane change to cause the host vehicle to perform a lane change;

initiating an adaptive cruise control system to cause the host vehicle to adjust the velocity of the host vehicle;

initiating a front collision alert system to generate an alert to an operator of the host vehicle warning of a potential front collision;

initiating a collision imminent braking system to apply brakes of the host vehicle to reduce the velocity of the host vehicle; or initiating an automated evasive steering system to adjust a trajectory of the host vehicle.

12. A non-transitory computer readable storage medium comprising a computer program product having program instructions embodied therewith, the program instructions executable by at least one processor to cause the at least one processor to perform operations comprising:

detecting a semi-truck in a lane adjacent to a host lane occupied by a host vehicle;

analyzing behavior of the semi-truck to determine a risk level associated with the semi-truck entering the host lane occupied by the host vehicle; and implementing a corrective action for the host vehicle based on the risk level associated with the semi-truck entering the host lane occupied by the host vehicle, wherein the risk level is determined at least in part on a first situation awareness metric and a second situation awareness metric, wherein the first situation awareness metric is a function of a velocity of the host vehicle, a difference in velocity between the velocity of the host vehicle and a velocity of the semi-truck, a lateral distance between the host vehicle and the semi-truck, a longitudinal distance between the host vehicle and the semi-truck, and a relative acceleration between the host vehicle and the semi-truck, and wherein the second situation awareness metric is a function of a curvature of a road upon which the host vehicle and the semi-truck are operating and a difference in velocity between the velocity of the host vehicle and a velocity of another vehicle that is behind the host vehicle.

13. The non-transitory computer readable storage medium of claim 12, wherein implementing the corrective action for the host vehicle comprises performing at least one of:

initiating an automated lane change to cause the host vehicle to perform a lane change;

initiating an adaptive cruise control system to cause the host vehicle to adjust a velocity the velocity of the host vehicle;

initiating a front collision alert system to generate an alert to an operator of the host vehicle warning of a potential front collision;

initiating a collision imminent braking system to apply brakes of the host vehicle to reduce the velocity of the host vehicle; or initiating an automated evasive steering system to adjust a trajectory of the host vehicle.

14. The non-transitory computer readable storage medium of claim 12, the operations further comprising determining whether the risk level exceeds a threshold.

15. The non-transitory computer readable storage medium of claim 14, wherein the corrective action is implemented responsive to determining that the risk level exceeds the threshold.

16. The non-transitory computer readable storage medium of claim 12, wherein the environmental conditions comprise information about a road upon which the host vehicle and the semi-truck are operating.

* * * * *